US012786240B2

(12) United States Patent
Sadasivarao et al.

(10) Patent No.: US 12,786,240 B2
(45) Date of Patent: Nov. 3, 2026

(54) PEER-TO-PEER NETWORK ROUTING

(71) Applicant: NVIDIA Corporation, Santa Clara, CA (US)

(72) Inventors: Abhinava Sadasivarao, San Ramon, CA (US); Radhika Mahankali, San Jose, CA (US); Prabhu Avinashi Sundaram, Fremont, CA (US); Vivek Venkatraman, Fremont, CA (US); Wilson Kok, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 18/745,609

(22) Filed: Jun. 17, 2024

(65) Prior Publication Data

US 2025/0385939 A1 Dec. 18, 2025

(51) Int. Cl.
*H04L 9/40* (2022.01)

(52) U.S. Cl.
CPC .......... *H04L 63/20* (2013.01); *H04L 63/0263* (2013.01)

(58) Field of Classification Search
CPC ............................ H04L 63/20; H04L 63/0263
USPC .............................................................. 726/1
See application file for complete search history.

(56) References Cited

U.S. PATENT DOCUMENTS

| | | | | |
|---|---|---|---|---|
| 6,768,718 | B1 * | 7/2004 | Beshai | H04L 45/00 370/237 |
| 7,522,627 | B2 * | 4/2009 | Lam | H04L 45/04 370/428 |
| 11,388,577 | B2 * | 7/2022 | Lumbatis | H04W 24/02 |
| 11,425,147 | B2 | 8/2022 | Raj | |
| 2012/0033620 | A1 * | 2/2012 | Thoen | H04J 3/0697 370/329 |
| 2016/0043996 | A1 | 2/2016 | Syed Mohamed et al. | |
| 2016/0294612 | A1 | 10/2016 | Ravinoothala et al. | |
| 2018/0249335 | A1 * | 8/2018 | Tripathi | H04L 45/64 |
| 2018/0359642 | A1 | 12/2018 | Torvinen et al. | |
| 2020/0137060 | A1 * | 4/2020 | Stecher | H04L 43/50 |
| 2021/0218772 | A1 * | 7/2021 | Alhaddad | G06F 21/554 |
| 2023/0054738 | A1 | 2/2023 | Agrawal et al. | |
| 2025/0385940 | A1 * | 12/2025 | Sadasivarao | H04L 63/20 |

* cited by examiner

*Primary Examiner* — Anthony D Brown
(74) *Attorney, Agent, or Firm* — Lowenstein Sandler LLP

(57) ABSTRACT

Systems and methods for sharing security capabilities of network devices are disclosed. A system for a first network device includes a memory. The system also includes one or more processors, coupled to the memory, to receive, at the first network device, security capabilities of a second network device of a network. The network includes the first network device and the second network device. The one or more processors are further to modify a routing table of the first network device based on the security capabilities of the second network device and transmit a data packet based on the modified routing table.

20 Claims, 8 Drawing Sheets

PEER-TO-PEER NETWORK ROUTING

TECHNICAL FIELD

At least one embodiment pertains to systems and methods for establishing secure connections through a network in a peer-to-peer manner.

BACKGROUND

Current networking devices can compute an optimal path through a network (e.g., through multiple network devices) based on certain characteristics of the networking devices, such as available bandwidth, latency, distance (e.g., number of hops, geographic distance, etc.), and the like. In some cases, optimal can mean that the path satisfies traffic engineering objectives, customer service-level agreements, and/or other business and/or networking objectives. After establishing a route for particular packets to follow from point A to point B, encryption (e.g., MACsec, IPsec, etc.) can be added to the route.

DETAILED DESCRIPTION

Figure 1:
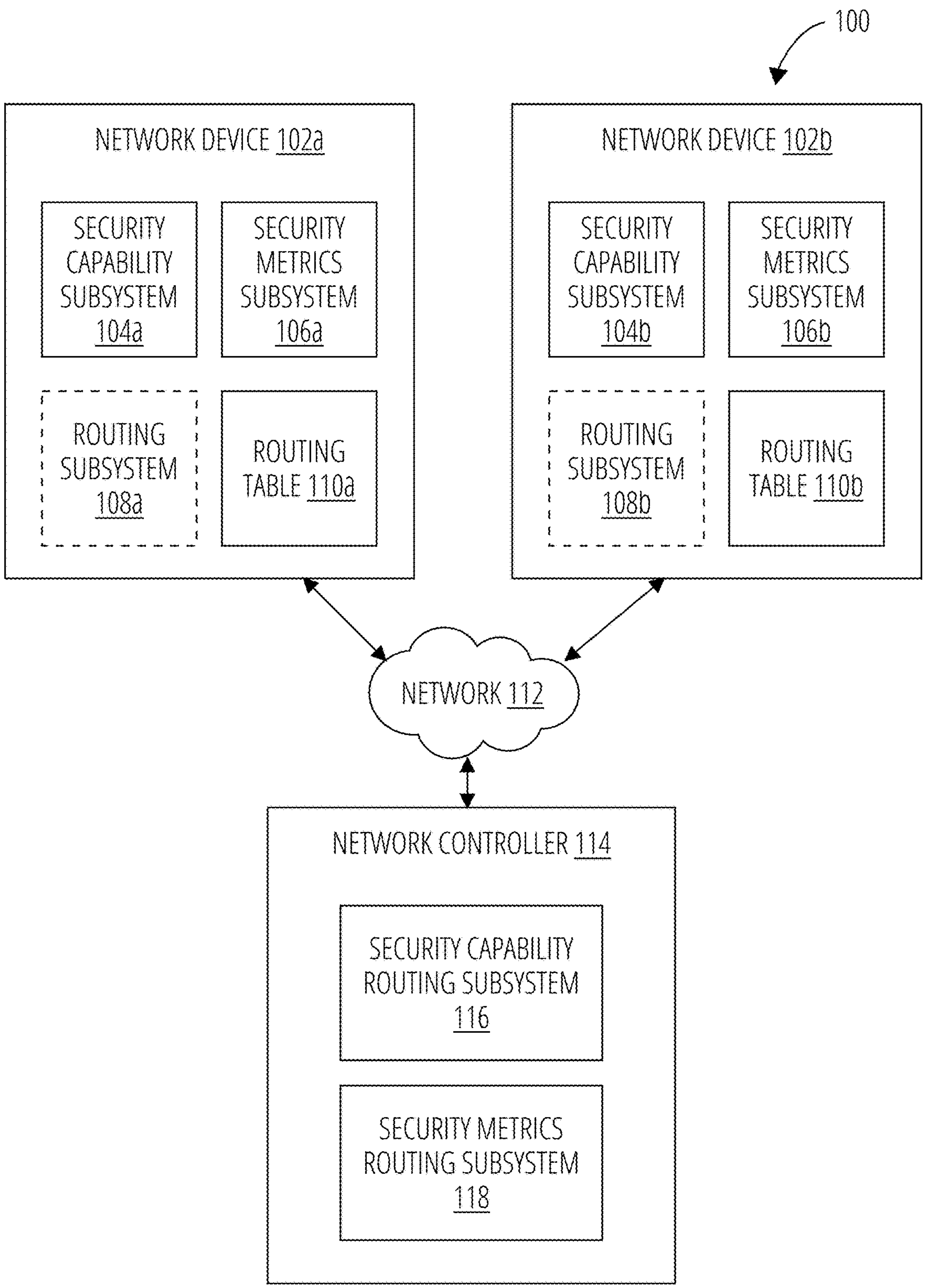
FIG. 1 illustrates an example system for secured routing through a network, in accordance with at least some embodiments.

After establishing a route through a network, encryption (e.g., MACsec, IPsec, etc.) can be added to the route. If one or more of the network devices along the route do not support the desired security characteristics (e.g., encryption method, cryptographic capabilities, etc.), a new route will need to be calculated and encryption will be attempted again. This can increase the time and effort required to configure paths through a network that meet certain security criteria.

Aspects and embodiments of the present disclosure address these and other technological challenges by providing for systems and techniques that allow for sharing security capabilities of a network device with other devices of the network to facilitate establishing routes through the network that meet certain security criteria. For example, an entity may wish to establish a connection (e.g., a network route) between point A (e.g., a datacenter in San Francisco) and point B (e.g., a datacenter in New York) through a network (e.g., the Internet). The entity may not be interested in the specific path travelled through the network so long as specified criteria are met. For example, the entity may desire the route through the network support at least 100 Gb of bandwidth (e.g., a network performance characteristic) and AES encryption at each network device along the path (e.g., a security network routing characteristic unique to this disclosure).

To determine which network devices of the network can be included in the route, each network device may determine its own security characteristics (e.g., which interface-level encryption capabilities are supported, which cipher suites are supported, which AES modes are supported, which characteristics of IPsec and/or MACsec are supported, whether one or more proprietary data plane encryption technologies (e.g., VXLANsec) are supported, etc.). Each network device may transmit a representation of its security characteristics to one or more other network devices (e.g., peer network devices, a network controller, etc.). The network performance characteristics (e.g., latency, bandwidth, etc.) (or a representation thereof) may also be transmitted to one or more network devices. Once each network device knows the network performance routing characteristics and the security network routing characteristics of the other network devices of the network (or once a central network controller knows the network performance routing characteristics and the security network routing characteristics of the network devices of the network), a network route may be determined that satisfies the routing criteria (e.g., using modified versions of network performance routing algorithms that additionally consider the security network routing characteristics of each network device). Each network device may update its local routing table according to the determined network route.

In some implementations, network routes may be determined (or updated/modified) based on past security performance of a network device. For example, in addition to transmitting to other network devices the determined security network routing characteristics of a network device, a network device may transmit metrics that can identify a "health" (e.g., security health) of the network device. The metrics may indicate a percentage of how many network packets were successfully encrypted/decrypted by the network device within a predetermined timeframe, how often the network device rotated encryption keys, how long it takes the network device to rotate encryption keys, and the like. A network route may be modified if one of the metrics fails to satisfy a predetermined criterion. For example, a network route may avoid a particular network device if it successfully encrypted/decrypted less than 90% (or 95%, 99%, 80%, etc.) of network packets received in the last hour (or day, 30 minutes, 15 minutes, week, etc.).

According to some aspects of the disclosure, the network devices of the network communicate with one another directly (e.g., peer-to-peer) and can update their own routing tables based on information (e.g., security capabilities, security metrics, etc.) received from peer network devices. According to other aspects of the disclosure, each network device communicates their security capabilities and security metrics to a central network controller. The network controller can generate routing tables for each network device based on the security capabilities and security metrics of each network device of the network (e.g., controller-based network routing). For example, the routing table can reflect the security capabilities and/or security metrics of one or more network devices. The network controller can transmit the routing table for each network device to the respective network device, which can route data packets through the network in accordance with the received routing table.

The advantages of the disclosed techniques include but are not limited to an improved security posture of networks that implement the disclosed techniques. The advantages of the disclosed techniques can also include improved robustness of network traffic engineering of networks that implement the disclosed techniques.

FIG. 1 illustrates an example system 100 for secured routing through a network, in accordance with at least some embodiments. System 100 can include one or more network devices 102*a-b* and network controller 114 connected to network 112. Network 112 can be a public network (e.g., the Internet), a private network (e.g., a local area network (LAN), or wide area network (WAN)), a wireless network, a personal area network (PAN), another network type, and/or a combination thereof. Network 112 can be a service provider network or a data center network. Network 112 can be a pure internet protocol (IP) routed network, a connection-oriented network (e.g., multiprotocol label switching (MPLS)), and/or an optical transport network (e.g., optical transport network (OTN), dense wavelength-division multiplexing (DWDM)11, etc.).

Network devices 102*a-b* can include security capability subsystems 104*a-b*, security metrics subsystems 106*a-b*, and routing tables 108*a-b*. According to some aspects of the disclosure, network devices 102*a-b* can include routing subsystems 108*a-b*. Network devices 102*a-b* can include physical network devices (e.g., routers, switches, access points, modems, hubs, optical network elements, etc.), virtual network devices (e.g., virtual network interfaces, virtual switches, virtual network adapters, etc.), and/or a combination thereof. In some embodiments, network devices 102*a-b* can be a component of a computing system. For example, network device 102*a* may be a data processing unit (DPU) of a computing system that may be connected to one or more other devices.

Each network device (e.g., network device 102*a*, network device 102*b*) can include a security capability subsystem (e.g., security capability subsystem 104*a*, security capability subsystem 104*b*) for identifying and reporting the security capabilities of the network device. For example, security capability subsystem 104*a* can identify and report the security capabilities of network device 102*a*.

Security capabilities identified by security capability subsystem 104*a* can include interface-level encryption capabilities, encryption-technology specific capabilities, secure boot capabilities, cryptographic signature capabilities, software version information, and/or firmware version information. Interface-level encryption capabilities can include information about MACsec, IPsec, VXLANsec, OTNsec, and the like. Encryption-technology specific capabilities can include information about cipher suites supported by the network device, supported advanced encryption standard (AES) modes, whether authenticated encryption (e.g., GCM) is supported, supported authentication algorithms, whether port-level or flow-level MACsec encryption is supported, key rotation capabilities, encryption latencies, and the like. Secure boot capabilities can include information about whether the network device can perform a secure boot (e.g., verifying a software/firmware signature before loading the software/firmware). Cryptographic signature capabilities can include information about whether the network device can perform cryptographic signature verification. Software and/or firmware version information can include information indicating whether particular security patches have been applied to the network device.

Security capability subsystem 104*a*, after identifying and/or determining the security capabilities of network device 102*a*, can report (e.g., transmit) the security capabilities (or a representation thereof) to one or more other devices. According to some aspects of the disclosure, security capability subsystem 104*a* can transmit the security capabilities to a peer network device (e.g., network device 102*b*). According to other aspects of the disclosure, security capability subsystem 104*a* can transmit the security capabilities to a network controller (e.g., a central device that manages connections and/or routes within a network).

Each network device (e.g., network device 102*a*, network device 102*b*) can include a security metrics subsystem (e.g., security metrics subsystem 106*a*, security metrics subsystem 106*b*) for identifying and reporting security metrics of the network device. For example, security metrics subsystem 106*a* can identify and report security metrics of network device 102*a*.

Security metrics identified by security metrics subsystem 106*a* can include indications of past security performance of a network device. For example, the security metrics may indicate a "health" of the network device. The security metrics can indicate a percentage of how many network packets were successfully encrypted/decrypted by the network device within a predetermined timeframe (e.g., 1 minute, 30 minutes, 1 hour, 12 hours, 1 day, etc.), how often the network device rotated encryption keys, how long it takes the network device to rotate encryption keys, and the like.

Security metrics subsystem 106*a*, after identifying and/or determining the security metrics of network device 102*a*, can report (e.g., transmit) the security metrics (or a representation thereof) to one or more other devices. According to some aspects of the disclosure, security metrics subsystem 106*a* can transmit the security metrics to a peer network device (e.g., network device 102*b*). According to other aspects of the disclosure, security metrics subsystem 106*a* can transmit the security capabilities to a network controller. In some embodiments, the security metrics are transmitted along with the security capabilities of the network device. For example, the security capabilities of the network device may be represented as a sequence of bits with one or more bits representing a different security capability of the network device. The security metrics may be represented as a sequence of bits that is appended to the sequence of bits that represent the security capabilities of the network device. In some embodiments, the security metrics are transmitted separately from the security capabilities of the network device.

According to some aspects of the disclosure, a network device (e.g., network device 102*a*, network device 102*b*) can include a routing subsystem (e.g., routing subsystem 108*a*, routing subsystem 108*b*) for modifying a routing table of the network device (e.g., routing table 110*a*, routing table 110*b*). For example, network device 102*a* may include routing subsystem 108*a* for modifying routing table 110*a*. Routing subsystem 108*a* can use one or more routing algorithms for modifying routing table 110. For example, routing subsystem 108*a* can use an interior gateway protocol (e.g., intermediate system to intermediate system (IS-IS), open shortest path first (OSPF), etc.) and/or an exterior gateway protocol (e.g., border gateway protocol (BGP), etc.). Routing subsystem 108*a* can add one or more routes to routing table 110*a* based on a combination of network performance routing characteristics (e.g., latency, bandwidth, number of hops, etc.) and security characteristics, such as those transmitted by security capability subsystems 104*a* and 104*b* and security metrics subsystem 106_a_ and 106_b_. For example, network device 102_a_ may be configured to establish a route to another network device (e.g., network device 102_b_) that supports at least 100 Gb of bandwidth and AES encryption. Based on information network device 102_a_ has received from peer network devices and/or network controller 114, routing subsystem 108_a_ may add a route to routing table 110_a_ that satisfies the 100 Gb bandwidth and AES encryption criteria.

According to some aspects of the disclosure, network device 102_a_ receives data related to the capabilities of peer network devices from the peer network devices. According to other aspects of the disclosure, network device 102_a_ receives data related to the capabilities of peer network devices from network controller 114, and routing subsystem 108_a_ can update routing table 110_a_ based on the information received from network controller 114. According to some aspects of the disclosure, network device 102_a_ does not include routing subsystem 108_a_ and receives routing table 110_a_ directly from network controller 114. After determining routing table 110_a_ (e.g., via routing subsystem 108_a_, via network controller 114, etc.), network device 102_a_ can transmit one or more packets via the route(s) included in routing table 110_a_.

A network route can be modified if one of the security metrics of a peer network device fails to satisfy a predetermined criterion. For example, routing table 110_a_ can be modified (e.g., by routing subsystem 108_a_, by network controller 114) based on security metrics of peer network devices. According to some aspects of the disclosure, the security metrics are received from the peer network device. According to other aspects of the disclosure, the security metrics are received from network controller 114. As an example, a network route may avoid a particular network device if, as indicated by security metrics of the network device, the network device successfully encrypted/decrypted less than 90% (or 95%, 99%, 80%, etc.) of network packets received in the last hour (or day, 30 minutes, 15 minutes, week, etc.). Routing subsystem 108_a_ can periodically evaluate whether routing table 110_a_ needs to be modified based on security metrics that fail to satisfy a predetermined criterion. In some cases, routing subsystem 108_a_ can include one or more alternative (e.g., backup, fallback, etc.) routes that satisfy the predetermined criterion in routing table 110_a_. If routing subsystem 108_a_ determines that a particular route fails to satisfy the predetermined criterion, routing subsystem 108_a_ can start to route traffic over one of the alternative routes included in routing table 110_a_.

According to some aspects of the disclosure, network controller 114 can determine routing tables for network devices of a network (e.g., network device 102_a_ and network device 102_b_ of network 112). Network controller 114 can include security capability routing subsystem 116 and security metrics routing subsystem 118. Security capability routing subsystem 116 can receive security capabilities from one or more network devices. Based on the received security capabilities, security capability routing subsystem 116 can generate and/or modify a routing table for each network device.

Each routing table may include route(s) between the network devices that satisfy one or more routing configurations (or segment(s) of routing configurations). For example, a routing configuration may define a connection (e.g., a network route) between point A (e.g., a datacenter in San Francisco) and point B (e.g., a datacenter in New York) through a network (e.g., the Internet, network 112, etc.). The routing configuration can include one or more criteria that the network route should satisfy. For example, the routing configuration may specify that the network route supports at least 100 Gb of bandwidth and AES encryption at each network device along the route. Based on the routing configuration and the received security capabilities of the network devices of the network, network controller 114 can generate a routing table for each network device such that the route(s) of the routing configuration are established within the network.

Security metrics routing subsystem 118 can receive security metrics from one or more network devices. Based on the received security metrics, security metrics routing subsystem 118 can generate and/or modify a routing table for each network device. As an example, routing configuration may include a security metrics criterion that requires that all network devices of the network route successfully encrypted/decrypted at least 90% (or 95%, 99%, 80%, etc.) of network packets received in the last hour (or day, 30 minutes, 15 minutes, week, etc.). If network controller 114 receives security metrics of a network device that fail to satisfy the security metrics criteria of a routing configuration, security metrics routing subsystem 118 may modify routes within routing tables of the network devices to avoid the network device that failed to satisfy the criteria.

After generating and/or modifying routing tables of network devices, network controller 114 can transmit the routing table corresponding to each network device to the respective network device. Each network device can receive the routing table from network controller 114 and being to route network data packets according to the received routing table.

According to some aspects of the disclosure, network devices (e.g., network device 102_a_, network device 102_b_) can transmit their security capabilities and/or their security metrics to network controller 114 (e.g., instead of to peer network devices). Network controller 114 can retransmit the security capabilities and/or security metrics of each network device to the other network devices of the network. Each network device can generate and/or modify their routing table based on security capabilities and/or security metrics received from network controller 114.

Figure 2:
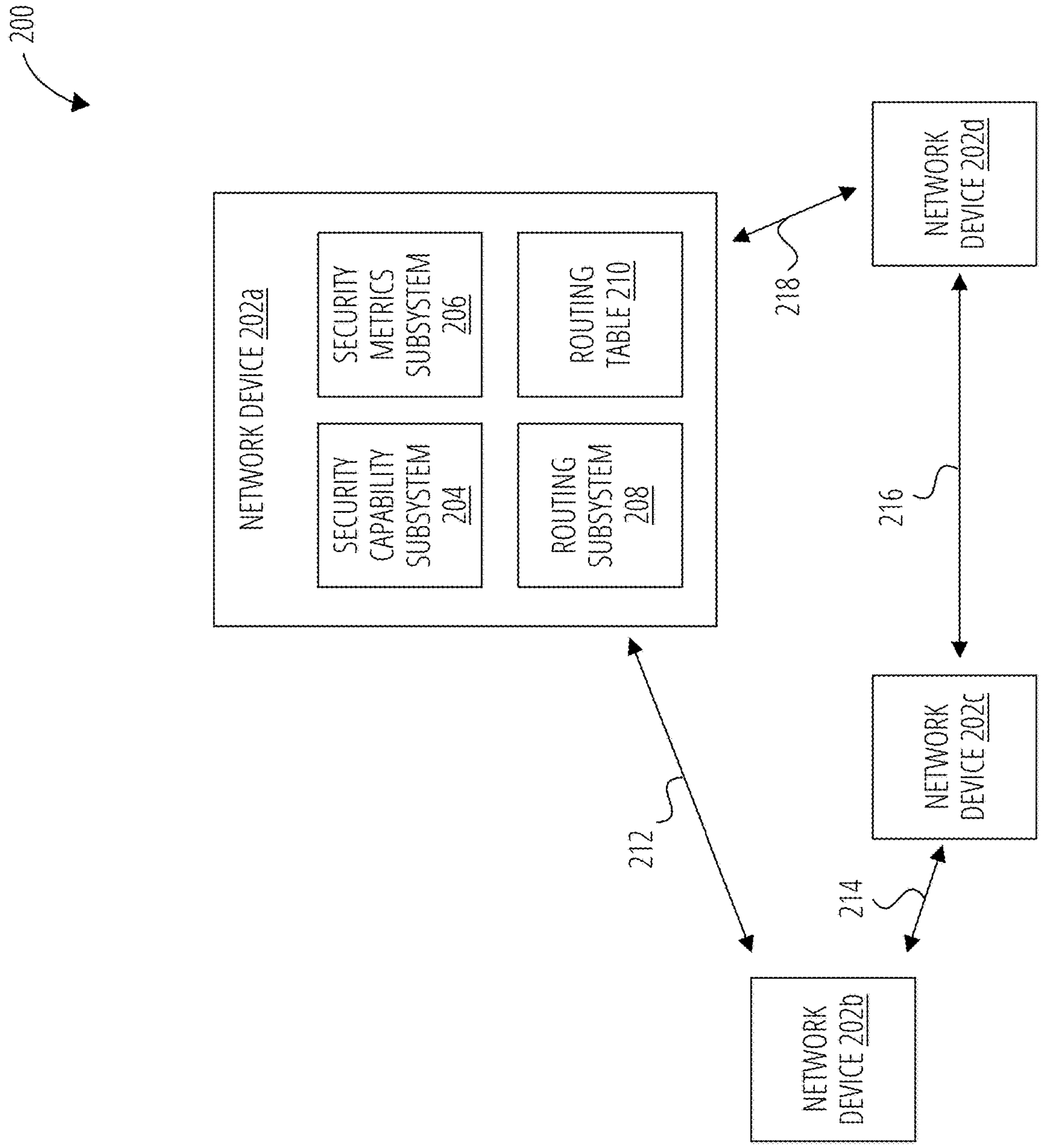
FIG. 2 illustrates an example network for secured network routing, in accordance with at least some embodiments.

FIG. 2 illustrates an example network 200 for secured network routing, in accordance with at least some embodiments. Network 200 can include one or more network devices, such as network device 202_a_, network device 202_b_, network device 202_c_, and network device 202_d_. Network devices of network 200 can be connected via one or more network connections, such as network connection 212 between network device 202_a_ and network device 202_b_, network connection 214 between network device 202_b_ and network device 202_c_, network connection 216 between network device 202_c_ and network device 202_d_, and network connection 218 between network device 202_a_ and network device 202_d_.

In some embodiments, network device 202_a_ can correspond to network device 102_a_ of FIG. 1. For simplicity, only the subsystems and routing table of network device 202_a_ are depicted, but it should be understood that network device 202_b_, network device 202_c_, and/or network device 202_d_ can include similar subsystems and corresponding routing tables.

Network device 202_a_ can include security capability subsystem 204 for determining the security capabilities of network device 202_a_ and for transmitting the security capabilities (or a representation thereof) to peer network devices. For example, security capability subsystem 204 can determine the cipher suites and AES encryption modes supported by network device 202*a* and can transmit a representation of that information to network device 202*b* via network connection 212 and/or to network device 202*d* via network connection 218. According to some aspects of the disclosure, security capability subsystem 204 transmits a representation of the security capabilities of network device 202*a* to all connected peer network devices. According to other aspects of the disclosure, security capability subsystem 204 transmits a representation of the security capabilities of network device 202*a* to a subset of connected peer network device.

Network device 202*a* can include security metrics subsystem 206 for calculating security metrics of network device 202*a* and for transmitting the security metrics (or a representation thereof) to peer network devices. For example, security metrics subsystem 206 can determine a percentage of successful encryptions/decryptions performed by network device 202*a* during a predetermined timeframe (e.g., 15 minutes, 1 hour, 12 hours, 1 day, 1 week, etc.) and can transmit a representation of that information to network device 202*b* via network connection 212 and/or to network device 202*d* via network connection 218. According to some aspects of the disclosure, security metrics subsystem 206 transmits a representation of the security metrics of network device 202*a* to all connected peer network devices. According to other aspects of the disclosure, security metrics subsystem 206 transmits a representation of the security metrics of network device 202*a* to a subset of connected peer network device.

According to some aspects of the disclosure, network device 202*a* can receive security capabilities and/or security metrics of a peer network device (or representations thereof) and can forward the data to connected peer network devices. For example, network device 202*a* can receive security capabilities and/or security metrics of network device 202*d* (or representations thereof) and can forward (e.g., retransmit) them to network device 202*b*, or vice versa. Thus, network device 202*b* and network device 202*d* can be informed of the security capabilities and/or security metrics of the other network device without being directly connected.

Network device 202*a* can include routing subsystem 208 for generating routing table 210. Routing subsystem 208 can receive security capabilities and/or security metrics (or representations thereof) from peer network devices (e.g., network device 202*b*, network device 202*c*, network device 202*d*) and can add routes to routing table 210 that satisfy a network configuration based on the received security capabilities and/or security metrics. For example, a network configuration can have a route between network device 202*a* and network device 202*c*. The network configuration may require that the route support AES encryption at each network device. If network device 202*d* does not support AES encryption and network device 202*b* does support AES encryption, routing subsystem 208 will add an entry to routing table 210 indicating that network packets intended for network device 202*c* should go to network device 202*b* via network connection 212 instead of going to network device 202*d* via network connection 218. The routing table of network device 202*b* would have a corresponding entry indicating that network packets from network device 202*a* via network connection 212 intended for network device 202*c* should be sent to network device 202*c* via network connection 214.

A network configuration can require that each network device along a route between two network devices have security metrics that satisfy a security metrics criterion. For example, a network configuration can require that each network device along the route between network device 202*a* and network device 202*c* have a successful encryption/decryption security metric of at least 90%. At a first time, routing subsystem 208 can include an entry in routing table 210 that indicating that network packets intended for network device 202*c* should go to network device 202*b* via network connection 212. At a second time, routing subsystem 208 can receive updated security metrics for network device 202*b* and for network device 202*d*. If the successful encryption/decryption security metric of network device 202*b* has fallen below 90% and the security metric of network device 202*d* is greater than or equal to 90%, routing subsystem 208 of network device 202*a* can modify routing table 210 to include an entry indicating that network packets intended for network device 202*c* should now go to network device 202*d* via network connection 218 instead of going to network device 202*b*. Upon receiving a network packet for network device 202*c*, network device 202*a* can send the network packet to network device 202*d* via network connection 218, in accordance with modified routing table 210.

A route through network 200 can pass through one or more network devices and can include one or more network connections. In some embodiments, two network devices in network 200 can be connected via more than one route. For example, network device 202*b* can connect to network device 202*d* via network connection 212 and network connection 218 or via network connection 214 and network connection 216. Based on the security capabilities and/or security metrics of network device 202*a* and network device 202*c*, network device 202*b* may use a different route to connect to network device 202*d*.

Figure 3:
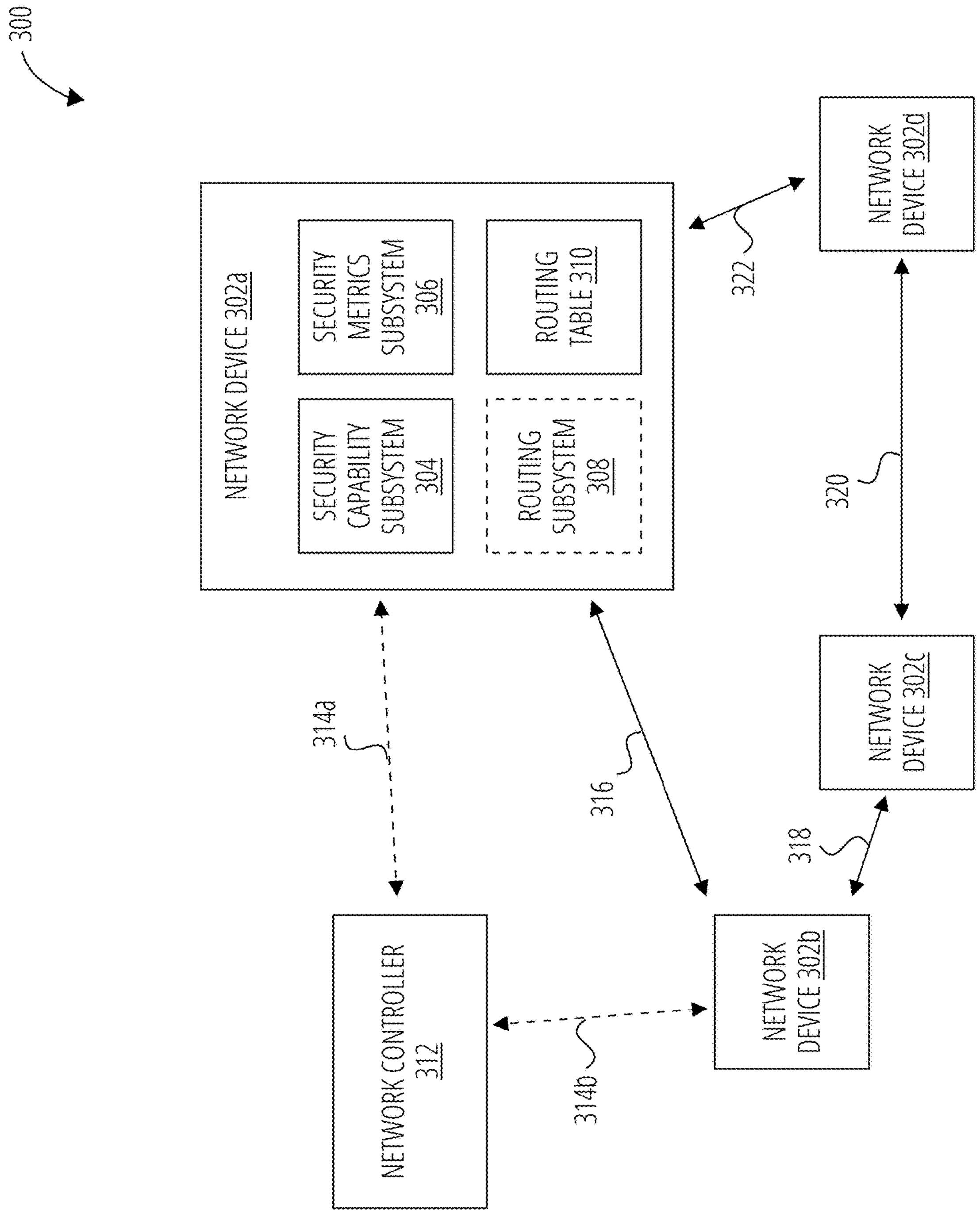
FIG. 3 illustrates an example network for secured network routing, in accordance with at least some embodiments.

FIG. 3 illustrates an example network 300 for secured network routing, in accordance with at least some embodiments. Network 300 can include one or more network devices, such as network device 302*a*, network device 302*b*, network device 302*c*, and network device 302*d*, and a network controller, such as network controller 312. Network controller 312 can include a software defined network (SDN) controller and/or a network management system (NMS).

Network devices of network 300 can be connected via one or more network connections, such as network connection 316 between network device 302*a* and network device 302*b*, network connection 318 between network device 302*b* and network device 302*c*, network connection 320 between network device 302*c* and network device 302*d*, and network connection 322 between network device 302*a* and network device 302*d*.

Network 300 can also include network controller 312 for determining routing tables for network devices of network 300. In some embodiments, network controller 312 can be the same as network controller 114 of FIG. 1. Network devices of network 300 can be connected to network controller 312 via one or more network controller connections, such as network controller connection 314*a* and network controller connection 314*b*. Only two network controller connections are depicted in FIG. 3, but it is to be understood that each network device can have a corresponding network controller connection.

Network device 302*a* can include security capability subsystem 304 for determining the security capabilities of network device 302*a* and for transmitting the security capabilities (or a representation thereof) to a network controller. For example, security capability subsystem 304 can determine whether network device 302*a* supports secure boot and can transmit a representation of that information to network controller 312 (e.g., via network controller connection 314*a*). According to some aspects of the disclosure, security capability subsystem 304 can transmit a representation of the security capabilities to both a network controller and one or more peer network devices.

Network device 302*a* can include security metrics subsystem 306 for calculating security metrics of network device 302*a* and for transmitting the security metrics (or a representation thereof) to a network controller. For example, security metrics subsystem 306 can determine a key-rotation latency of network device 302*a* and can transmit a representation of that information to network controller 312 (e.g., via network controller connection 314*a*). According to some aspects of the disclosure, security metrics subsystem 306 can transmit a representation of the security metrics to both a network controller and one or more peer network devices.

According to some aspects of the disclosure, network device 302*a* can include routing subsystem 308 for generating routing table 310. Routing subsystem 308 can receive security capabilities and/or security metrics (or representations thereof) of peer network devices (e.g., network device 302*b*, network device 302*c*, network device 302*d*) from network controller 312 and can add routes to routing table 310 that satisfy a network configuration based on the received security capabilities and/or security metrics. According to other aspects of the disclosure, network device 302*a* receives routing table 310 from network controller 312 (e.g., via network controller connection 314*a*) instead of generating routing table 310 itself.

Network controller 312 can determine routing tables for network devices of network 300. According to some aspects of the disclosure, network controller 312 receives security capabilities and security metrics (or representations thereof) of network devices of network 300. For example, security capability subsystems (e.g., security capability subsystem 304) and/or security metrics subsystems (e.g., security metrics subsystem 306) of the network devices of network 300 may transmit their respective security capabilities and/or security metrics (or representations thereof) to network controller 312 via one or more network controller connections, such as network controller connection 314*a* and network controller connection 314*b*.

Network controller 312 can generate a routing table for each network device of network 300 based on the security capabilities and security metrics of the network devices of network 300. Network controller 312 can generate routing tables based on the security capabilities and security metrics that satisfy security criteria of a network configuration.

Network controller 312 can receive periodic security capability and/or security metric updates from network devices. Network controller 312 can generate modified routing tables based on the updated security capabilities and/or security metrics. The modified routing tables can be provided to the corresponding network devices, which can start to route packets based on the modified routing table. According to some aspects of the disclosure, routing tables for each network device are provided to all network devices. According to some aspects of the disclosure, routing tables for each network device are provided only to the respective network device. According to some aspects of the disclosure, multiple routing tables can be generated for a network device over time. For example, a network device may receive a first routing table at a first time, a second routing table at a second time, a third routing table at a third time, etc.

Figure 4:
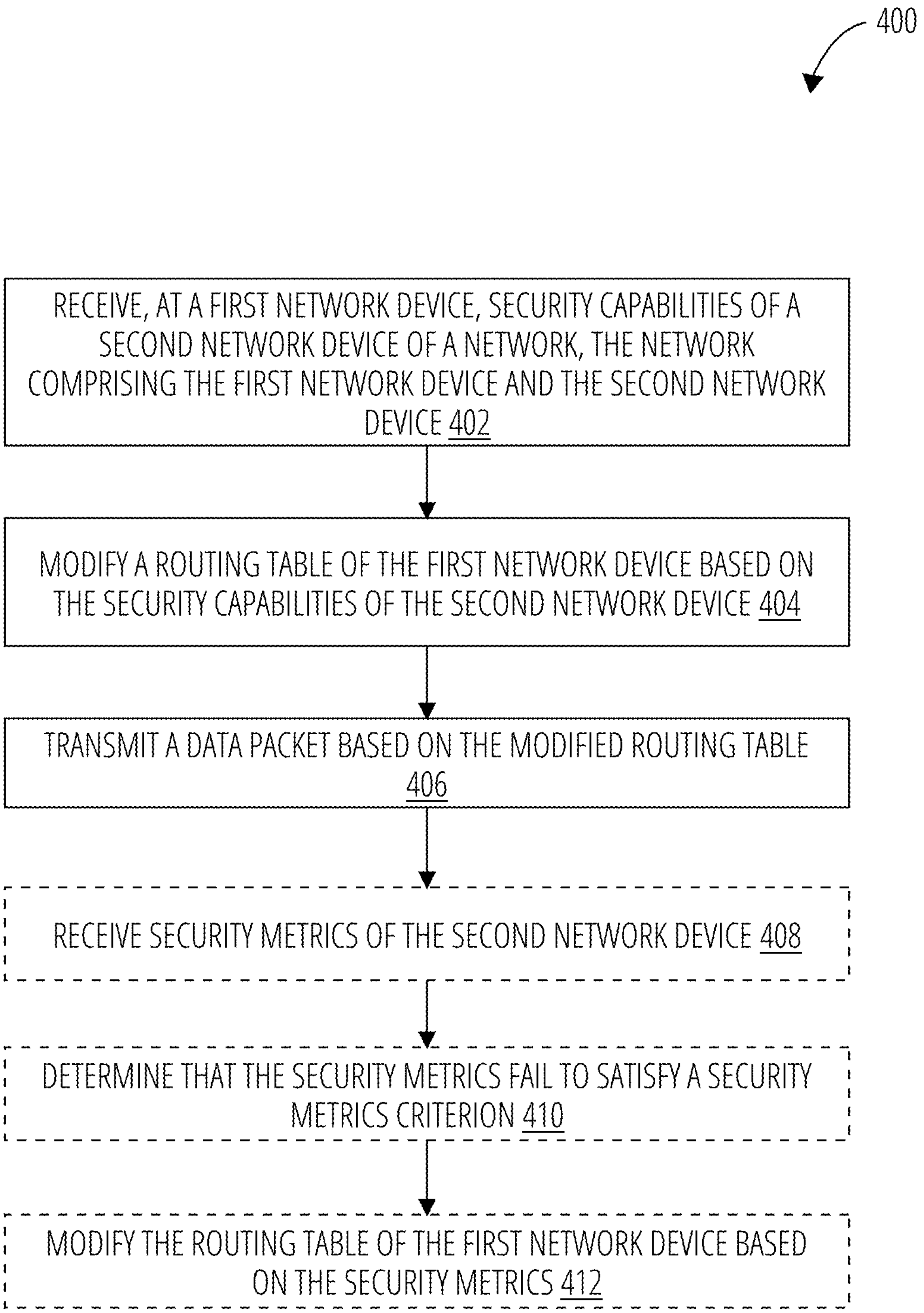
FIG. 4 is a flow diagram of an example method for secured network routing, in accordance with at least one embodiment.
Figure 5:
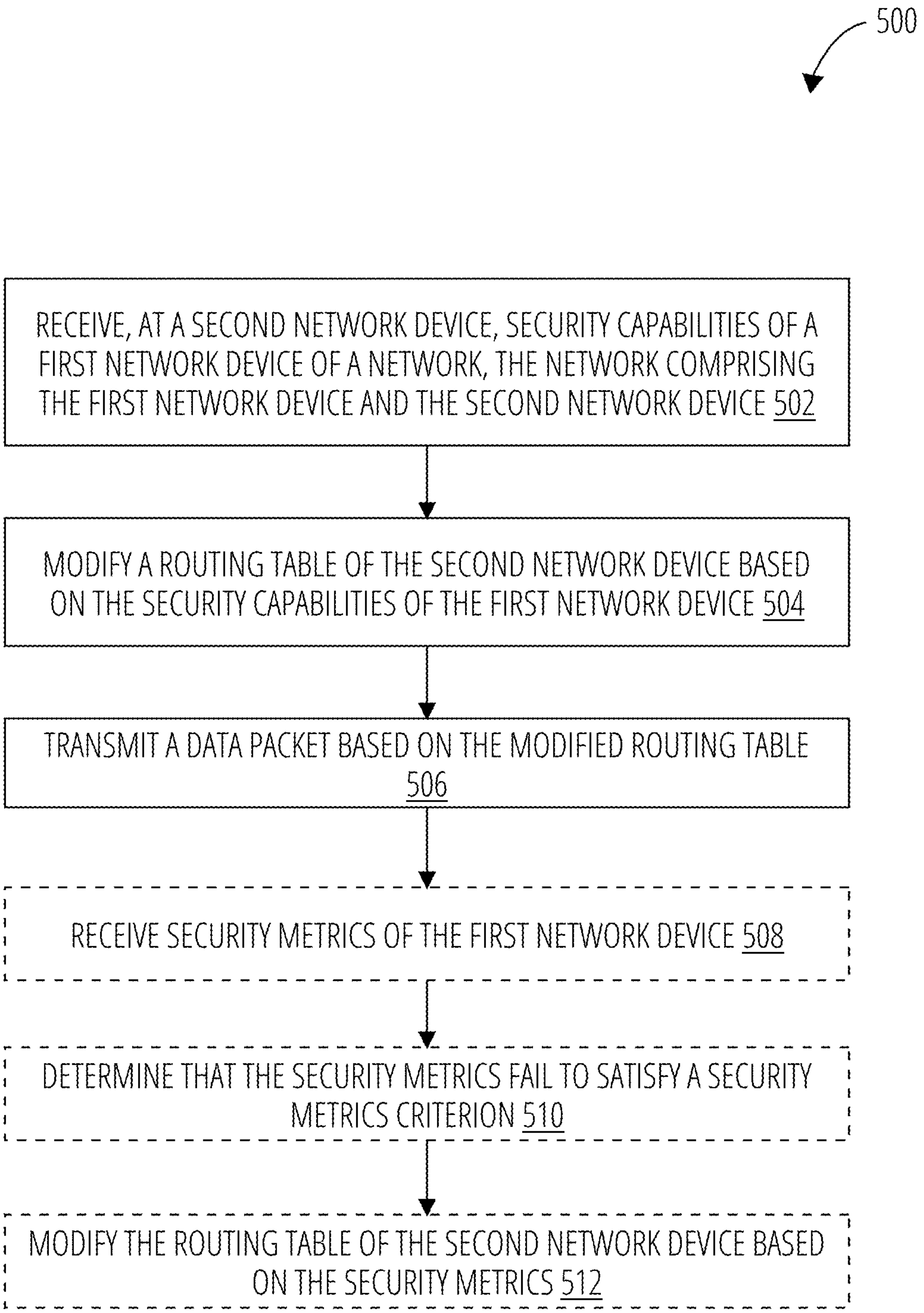
FIG. 5 is a flow diagram of an example method for secured network routing, in accordance with at least one embodiment.

FIG. 4 is a flow diagram of an example method 400 for secured network routing, in accordance with at least one embodiment. FIG. 5 is a flow diagram of an example method 500 for secured network routing, in accordance with at least one embodiment. Methods 400 and/or 500 may be performed using one or more processing units or processors (e.g., CPUs, GPUs, accelerators, physics processing units (PPUs), data processing units (DPUs), etc.), which may include (or communicate with) one or more memory devices. According to some aspects of the disclosure, methods 400 and/or 500 may be performed using a processing device. According to some aspects of the disclosure, methods 400 and/or 500 may be performed using processing units of network device 102*a* and/or network device 102*b* of FIG. 1. According to some aspects of the disclosure, processing units performing any of methods 400 and/or 500 may be executing instructions stored on a non-transient computer-readable storage media. According to some aspects of the disclosure, any of methods 400 and/or 500 may be performed using multiple processing threads (e.g., CPU threads and/or GPU threads), individual threads executing one or more individual functions, routines, subroutines, or operations of the method. According to some aspects of the disclosure, processing threads implementing any of methods 400 and/or 500 may be synchronized (e.g., using semaphores, critical sections, and/or other thread synchronization mechanisms). Alternatively, processing threads implementing any of methods 400 and/or 500 may be executed asynchronously with respect to each other. Various operations of methods 400 and/or 500 may be performed in a different order compared with the order shown in FIG. 4. Some operations of methods 400 and/or 500 may be performed concurrently with other operations. According to some aspects of the disclosure, one or more operations shown in FIG. 4 and/or FIG. 5 may not always be performed.

Referring to FIG. 4, at block 402, processing units executing method 400 can receive, at a first network device (e.g., network device 102*a*, etc.), security capabilities of a second network device (e.g., network device 102*b*) of a network. The network can include the first network device and the second network device. The security capabilities of the second network device can include interface-level encryption capabilities (e.g., information about MACsec, IPsec, VXLANsec, OTNsec, etc.), encryption-technology specific capabilities (e.g., information about cipher suites supported by the network device, supported advanced encryption standard (AES) modes, whether authenticated encryption (e.g., GCM) is supported, supported authentication algorithms, whether port-level or flow-level MACsec encryption is supported, key rotation capabilities, encryption latencies, etc.), secure boot capabilities (e.g., information about whether the network device can perform a secure boot (e.g., verifying a software/firmware signature before loading the software/firmware)), cryptographic signature capabilities (e.g., information about whether the network device can perform cryptographic signature verification), software version information, and/or firmware version information (e.g., whether particular security patches have been applied to the network device).

At block 404, processing units can modify a routing table of the first network device (e.g., routing table 110*a*) based on the security capabilities of the second network device. For example, a routing algorithm (e.g., IS-IS, OSPF, BGP, EGP, etc.) can be used to calculate route(s) through the network based on the security capabilities of the second network device and/or one or more properties of other network devices in the network (if present). Processing units can modify the routing table of the first network device based on the calculated route(s). For example, a first route through the network may exist with the first network device forwarding packets for a destination device to a third network device that does not support one or more security capabilities. Based on the security capabilities of the second network device received at the first network device (e.g., if the second network device supports one or more security capabilities that the third network device does not support), the first route can be updated so the first network device forwards packets for the destination device to the second network device, thus improving the security posture of the network. At block 406, processing units can transmit a data packet (e.g., to the second network device instead of to the third network device) based on the modified routing table.

According to some aspects of the disclosure, at block 408, processing units can receive security metrics of the second network device. At block 410, processing units can determine that the security metrics fail to satisfy a security metrics criterion. At block 412, processing units can modify the routing table of the first network device based on the security metrics. For example, a second route through the network may exist with the first network device forwarding packets for a second destination device to the second network device, which supports one or more security capabilities. The first network device can receive security metrics of the second network device, which may, for example, indicate the percentage of network packets that have been successfully encrypted/decrypted within a predetermined timeframe. If the security metrics fail to satisfy a security metrics criterion (e.g., if the percentage of successful encryption/decryptions falls below a predetermined threshold), the routing table of the first network device can be modified to forward network packets for the second destination device to another network device (e.g., a fourth network device, which supports one or more security capabilities and has security metrics that satisfy the security metrics criterion) instead of to the second network device.

Referring to FIG. 5, at block 502, processing units executing method 500 can receive, at a second network device (e.g., network device 102*b*, etc.), security capabilities of a first network device (e.g., network device 102*a*) of a network. The network can include the first network device and the second network device. The security capabilities of the first network device can include interface-level encryption capabilities, encryption-technology specific capabilities, secure boot capabilities, cryptographic signature capabilities, software version information, and/or firmware version information.

At block 504, processing units can modify a routing table of the second network device (e.g., routing table 110*b*) based on the security capabilities of the first network device. For example, a routing algorithm (e.g., IS-IS, OSPF, BGP, EGP, etc.) can be used to calculate route(s) through the network based on the security capabilities of the first network device and/or one or more properties of other network devices in the network (if present). Processing units can modify the routing table of the second network device based on the calculated route(s). At block 506, processing units can transmit a data packet based on the modified routing table.

According to some aspects of the disclosure, at block 508, processing units can receive security metrics of the first network device. At block 510, processing units can determine that the security metrics fail to satisfy a security metrics criterion. At block 512, processing units can modify the routing table of the second network device based on the security metrics.

Figure 6:
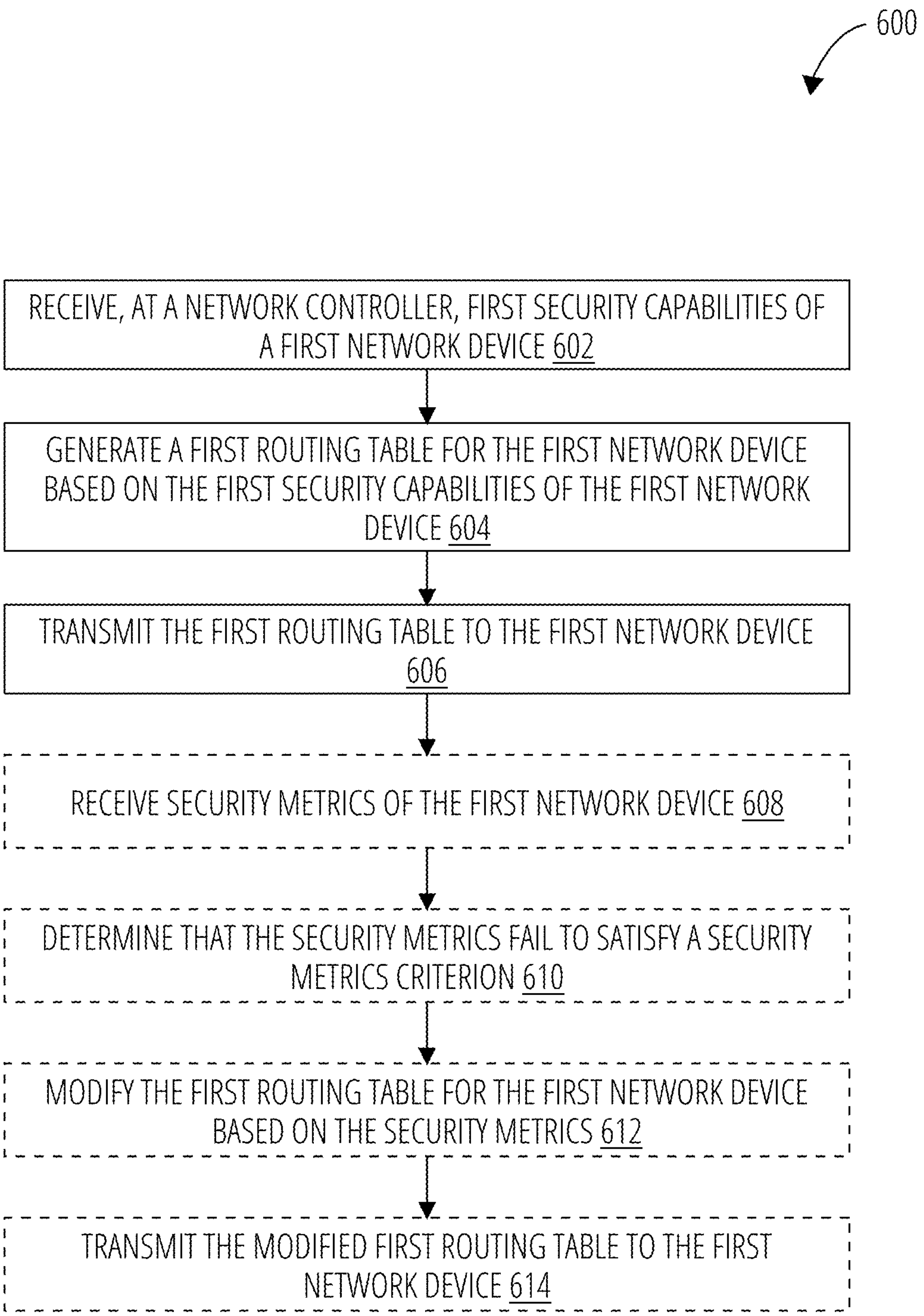
FIG. 6 is a flow diagram of an example method for secured network routing, in accordance with at least one embodiment.
Figure 7:
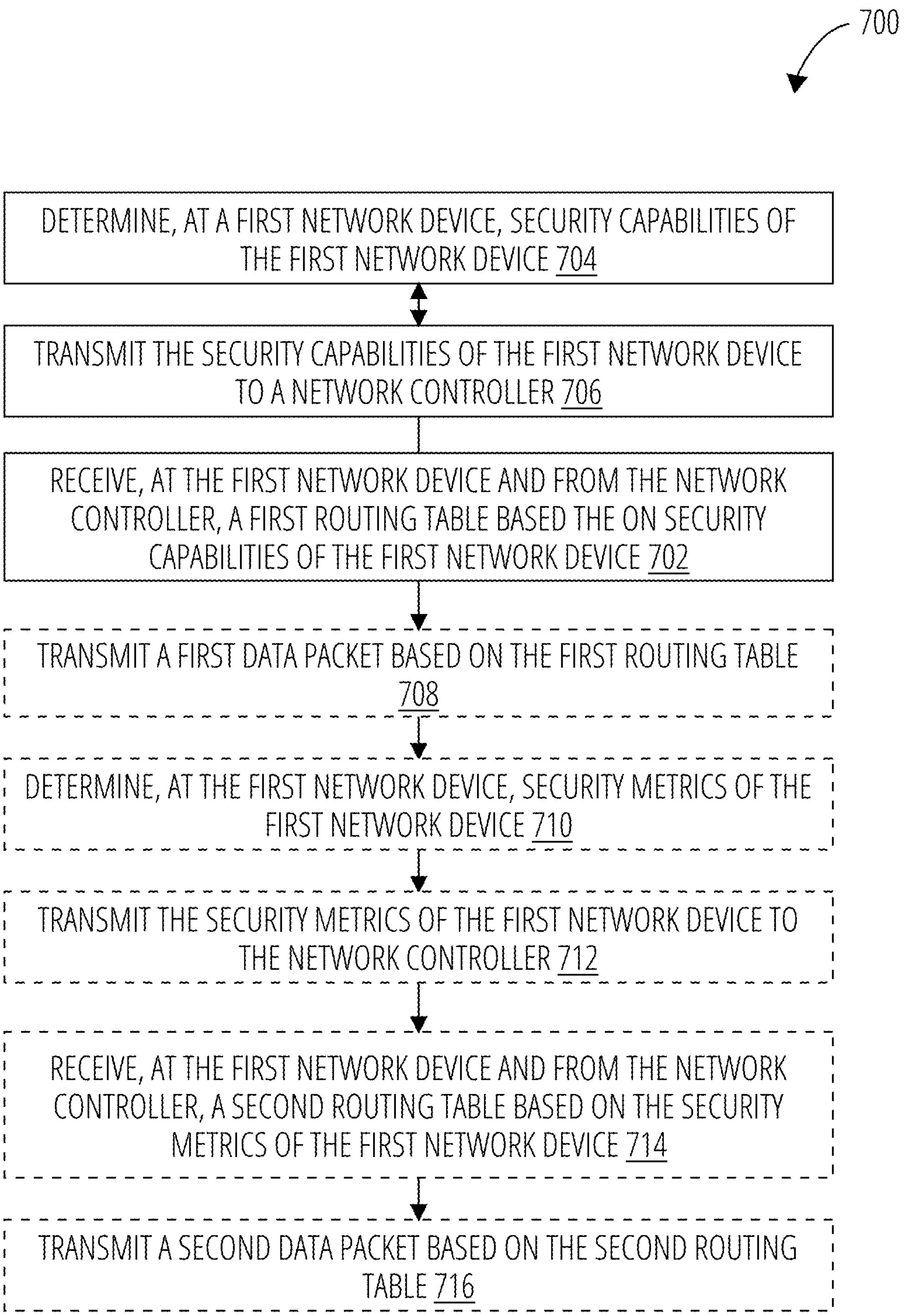
FIG. 7 is a flow diagram of an example method for secured network routing, in accordance with at least one embodiment.

FIG. 6 is a flow diagram of an example method 600 for secured network routing, in accordance with at least one embodiment. FIG. 7 is a flow diagram of an example method 700 for secured network routing, in accordance with at least one embodiment. Methods 600 and/or 700 may be performed using one or more processing units or processors (e.g., CPUs, GPUs, accelerators, physics processing units (PPUs), data processing units (DPUs), etc.), which may include (or communicate with) one or more memory devices. According to some aspects of the disclosure, methods 600 and/or 700 may be performed using a processing device. According to some aspects of the disclosure, method 600 may be performed using processing units of network controller 114 of FIG. 1, and method 700 may be performed using processing units of network device 102*a* and/or network device 102*b* of FIG. 1. According to some aspects of the disclosure, processing units performing any of methods 600 and/or 700 may be executing instructions stored on a non-transient computer-readable storage media. According to some aspects of the disclosure, any of methods 600 and/or 700 may be performed using multiple processing threads (e.g., CPU threads and/or GPU threads), individual threads executing one or more individual functions, routines, subroutines, or operations of the method. According to some aspects of the disclosure, processing threads implementing any of methods 600 and/or 700 may be synchronized (e.g., using semaphores, critical sections, and/or other thread synchronization mechanisms). Alternatively, processing threads implementing any of methods 600 and/or 700 may be executed asynchronously with respect to each other. Various operations of methods 600 and/or 700 may be performed in a different order compared with the order shown in FIG. 6 and/or FIG. 7. Some operations of methods 600 and/or 700 may be performed concurrently with other operations. According to some aspects of the disclosure, one or more operations shown in FIG. 6 and/or FIG. 7 may not always be performed.

Referring to FIG. 6, at block 602, processing units executing method 600 can receive, at a network controller (e.g., network controller 114, network controller 312), first security capabilities of a first network device. The security capabilities of the first network device can include interface-level encryption capabilities, encryption-technology specific capabilities, secure boot capabilities, cryptographic signature capabilities, software version information, and/or firmware version information.

At block 604, processing units can generate a first routing table for the first network device based on the first security capabilities of the first network device. A routing algorithm (e.g., IS-IS, OSPF, BGP, EGP, etc.) can be used to calculate route(s) through the network based on the security capabilities of the first network device and/or one or more properties of other network devices in the network (if present). At block 606, processing units can transmit the first routing table to the first network device (e.g., via a network controller connection as depicted in FIG. 3).

According to some aspects of the disclosure, at block 608, processing units can receive security metrics of the first network device. At block 610, processing units can determine that the security metrics fail to satisfy a security metrics criterion. At block 612, processing units can modify the first routing table for the first network device based on the security metrics. At block 614, processing units can transmit the modified first routing table to the first network device.

Referring to FIG. 7, at block 704, processing units executing method 700 can determine, at a first network device, security capabilities of the first network device. At block 706, processing units can transmit the security capabilities of the first network device to a network controller. At block 702, processing units can receive, at the first network device and from the network controller, a first routing table based on the security capabilities of the first network device. In some embodiments, the first routing table can be further based on security capabilities of a second network device. In some embodiments, at block 708, processing units can transmit a first data packet based on the first routing table.

In some embodiments, at block 710, processing units can determine, at the first network device, security metrics of the first network device. At block 712, processing units can transmit the security metrics of the first network device to the network controller. At block 714, processing units can receive, at the first network device and from the network controller, a second routing table based on the security metrics of the first network device. In some embodiments, the second routing table can be further based on the security metrics of a second network device. For example, in some embodiments, the second routing table reflects the security metrics of the second network device. At block 716, processing units can transmit a second data packet based on the second routing table.

Figure 8:
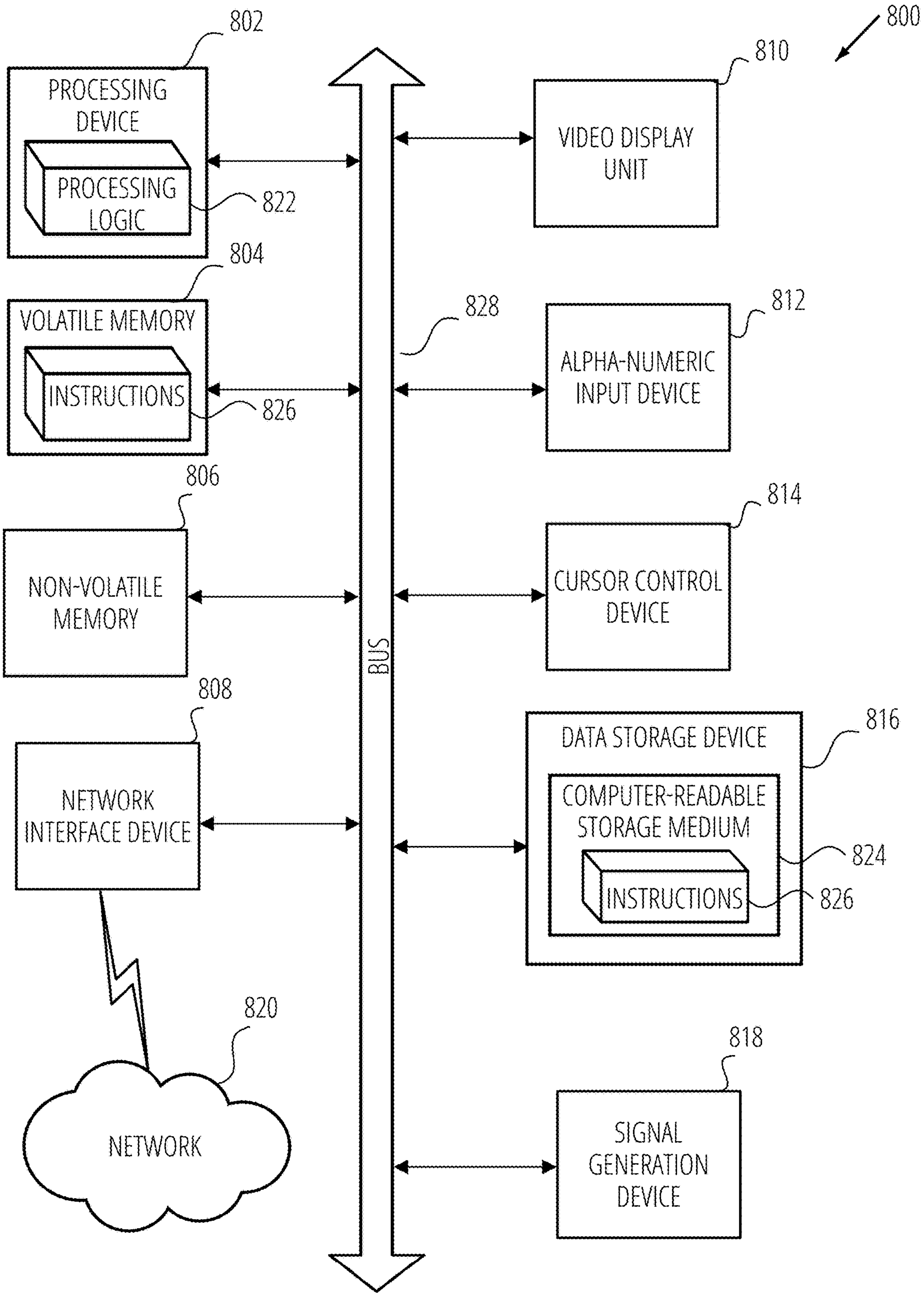
FIG. 8 is a block diagram illustrating an exemplary computer system, in accordance with at least one embodiment of the present disclosure.

FIG. 8 is a block diagram illustrating an exemplary computer system, in accordance with at least one embodiment of the present disclosure. The computer system 800 can correspond to network device 102, network device 102*b*, and/or network controller 114 described with respect to FIG. 1. Computer system 800 can operate in the capacity of a server or an endpoint machine in an endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processing device (processor) 802, a main memory 804 (e.g., read-only memory (ROM), flash memory, dynamic random access memory (DRAM) such as synchronous DRAM (SDRAM), double data rate (DDR SDRAM), or DRAM (RDRAM), etc.), a static memory 806 (e.g., flash memory, static random access memory (SRAM), etc.), and a data storage device 816, which communicate with each other via a bus 828.

Processor (processing device) 802 represents one or more general-purpose processing devices such as a microprocessor, central processing unit, or the like, and may include processing logic 822. More particularly, the processor 802 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 802 can also be one or more special-purpose processing devices such as an application specific integrated circuit (ASIC), a field programmable gate array (FPGA), a digital signal processor (DSP), network processor, or the like. The processor 802 is configured to execute instructions 826 (e.g., for generating threat indicator alerts) for performing the operations discussed herein.

The computer system 800 can further include a network interface device 808. The computer system 800 also can include a video display unit 810 (e.g., a liquid crystal display (LCD) or a cathode ray tube (CRT)), an input device 812 (e.g., a keyboard, and alphanumeric keyboard, a motion sensing input device, touch screen), a cursor control device 814 (e.g., a mouse), and a signal generation device 818 (e.g., a speaker). In some embodiments, computer system 800 may not include video display unit 810, input device 812, and/or cursor control device 814 (e.g., in a headless configuration).

The data storage device 816 can include a non-transitory machine-readable storage medium 824 (also computer-readable storage medium) on which is stored one or more sets of instructions 826 (e.g., for network routing based on security capabilities of network devices) embodying any one or more of the methodologies or functions described herein. The instructions 826 can also reside, completely or at least partially, within the main memory 804 and/or within the processor 802 during execution thereof by the computer system 800, the main memory 804 and the processor 802 also constituting machine-readable storage media. The instructions can further be transmitted or received over a network 820 via the network interface device 808.

In one implementation, the instructions 826 include instructions for network routing based on security capabilities of network devices. While the computer-readable storage medium 824 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Other variations are within the spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any appropriate nonempty subset of set of A and B and C. For instance, in illustrative example of a set having three members, conjunctive phrases "at least one of A, B, and C" and "at least one of A, B and C" refer to any appropriate of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any appropriate device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system"

and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example embodiments of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A system for a first network device comprising:
- a memory; and
- one or more processors, coupled to the memory, to:
- receive, at the first network device, security capabilities of a second network device of a network, the security capabilities comprising encryption-specific capabilities of the second network device, the network comprising the first network device and the second network device;
- responsive to receiving the security capabilities comprising the encryption-specific capabilities of the second network device, locally modify a routing table of the first network device to indicate at least one route that satisfies security criteria based on the received security capabilities comprising the encryption-specific capabilities of the second network device; and
- transmit a data packet based on the modified routing table.

2. The system of claim 1, wherein the encryption-specific capabilities of the second network device comprise at least one of:
- interface-level encryption capabilities;
- encryption-technology specific capabilities; or
- cryptographic signature capabilities; and
- wherein the security capabilities of the second network device further comprise at least one of:
- secure boot capabilities;
- software version information; or
- firmware version information.

3. The system of claim 1, wherein the security capabilities of the second network device are received from the second network device.

4. The system of claim 1, wherein the one or more processors are further to:
- determine security capabilities of the first network device; and
- transmit the security capabilities of the first network device to the second network device.

5. The system of claim 1, wherein the security capabilities of the second network device are received from a network controller.

6. The system of claim 5, wherein the one or more processors are further to:
- determine security capabilities of the first network device; and
- transmit the security capabilities of the first network device to the network controller.

7. The system of claim 1, wherein the one or more processors are further to:
- receive security metrics of the second network device;
- determine that the security metrics fail to satisfy a security metrics criterion; and
- modify the routing table of the first network device based on the security metrics.

8. The system of claim 7, wherein the security metrics are received from the second network device.

9. The system of claim 7, wherein the security metrics are received from a network controller.

10. A method comprising:
- receiving, at a first network device, security capabilities of a second network device of a network, the security capabilities comprising encryption-specific capabilities of the second network device, the network comprising the first network device and the second network device;
- responsive to receiving the security capabilities comprising the encryption-specific capabilities of the second network device, locally modifying a routing table of the first network device to indicate at least one route that satisfies security criteria based on the received security capabilities comprising the encryption-specific capabilities of the second network device; and
- transmitting a data packet based on the modified routing table.

11. The method of claim 10, wherein the encryption-specific capabilities of the second network device comprise at least one of:
- interface-level encryption capabilities;
- encryption-technology specific capabilities; or
- cryptographic signature capabilities; and
- wherein the security capabilities of the second network device further comprise at least one of:
- secure boot capabilities;
- software version information; or
- firmware version information.

12. The method of claim 10, wherein the security capabilities of the second network device are received from the second network device.

13. The method of claim 10, further comprising:
- determining security capabilities of the first network device; and
- transmitting the security capabilities of the first network device to the second network device.

14. The method of claim 10, wherein the security capabilities of the second network device are received from a network controller.

15. The method of claim 14, further comprising:

determining security capabilities of the first network device; and transmitting the security capabilities of the first network device to the network controller.

16. The method of claim 10, further comprising:

receiving security metrics of the second network device;

determining that the security metrics fail to satisfy a security metrics criterion; and modifying the routing table of the first network device based on the security metrics.

17. The method of claim 16, wherein the security metrics are received from the second network device.

18. The method of claim 16, wherein the security metrics are received from a network controller.

19. A network device comprising:

one or more processors to transmit a data packet based on a locally modified routing table;

wherein the locally modified routing table indicates at least one route that satisfies security criteria based on security capabilities of a second network device of a network, the security capabilities of the second network device comprising encryption-specific capabilities of the second network device, the network comprising the network device and the second network device, and the security capabilities comprising the encryption-specific capabilities of the second network device having been received by the one or more processors.

20. The network device of claim 19, wherein the encryption-specific capabilities of the second network device comprise at least one of:

interface-level encryption capabilities;

encryption-technology specific capabilities; or cryptographic signature capabilities; and wherein the security capabilities of the second network device further comprise at least one of:

secure boot capabilities;

software version information; or firmware version information.

* * * * *